(No Model.) 2 Sheets—Sheet 1.

N. H. NELSON.
DRAFT EQUALIZER.

No. 566,008. Patented Aug. 18, 1896.

Witnesses:
Howard D. Orr.
Edwin Keal.

Inventor:
Nels H. Nelson.
By Van Buren Hillyard,
Atty.

(No Model.) 2 Sheets—Sheet 2.
N. H. NELSON.
DRAFT EQUALIZER.
No. 566,008. Patented Aug. 18, 1896.
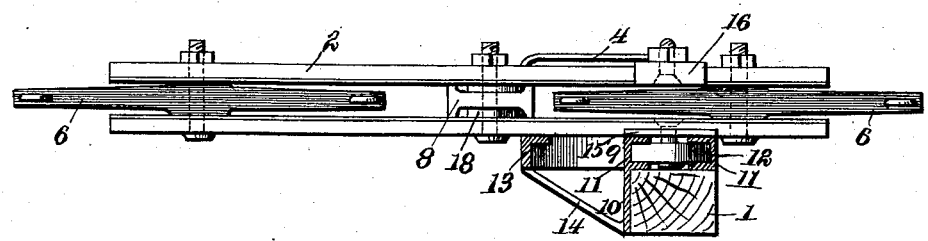
Fig. 3.
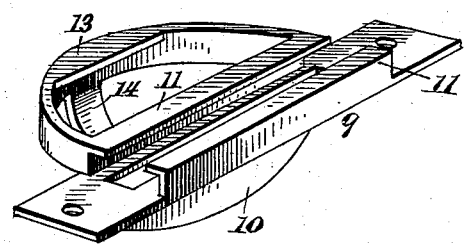
Fig. 4.
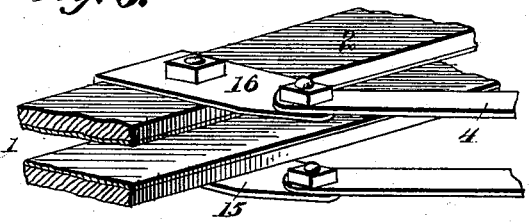
Fig. 6.
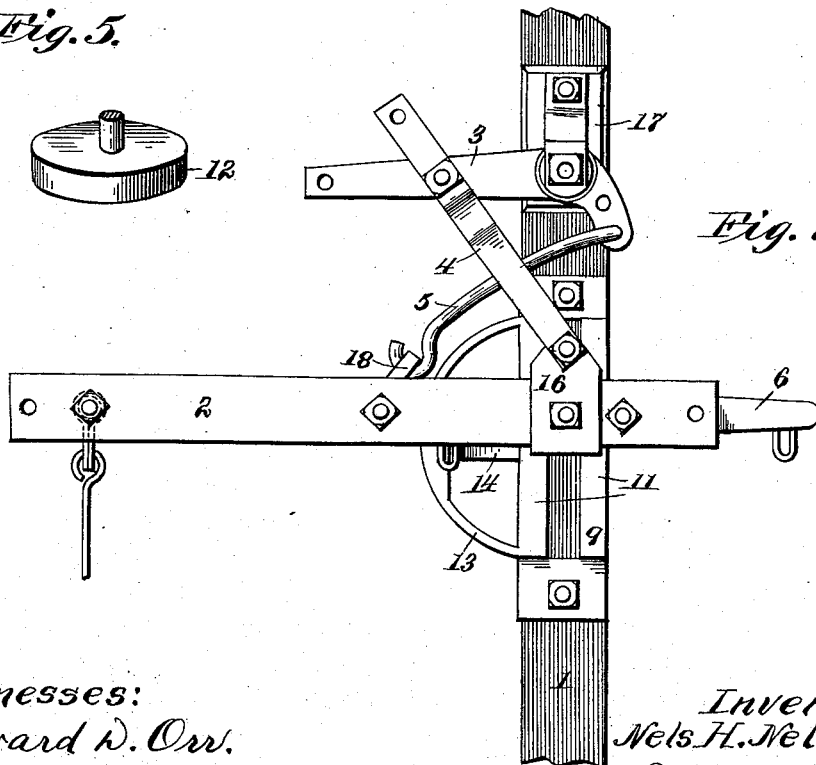
Fig. 5.
Fig. 7.
Witnesses:
Howard D. Orr.
Edwin Real
Inventor:
Nels H. Nelson,
By Van Buren Hillyard,
Atty.

UNITED STATES PATENT OFFICE.

NELS H. NELSON, OF ST. JOHN'S, MINNESOTA.

DRAFT-EQUALIZER.

SPECIFICATION forming part of Letters Patent No. 566,008, dated August 18, 1896.

Application filed November 4, 1895. Serial No. 567,893. (No model.)

*To all whom it may concern:*

Be it known that I, NELS H. NELSON, a citizen of the United States, residing at St. John's, in the county of Kandiyohi and State of Minnesota, have invented certain new and useful Improvements in Draft-Equalizers, of which the following is a specification, reference being had to the accompanying drawings.

The purpose of the present invention is the provision of a draft equalizer or evener to be used in connection with binders, plows, harrows, cultivators, and other agricultural implements which are drawn over the field by a team of three or more horses, and has for its object to prevent side draft and to obviate any slack in the pulling, and to cause the horses to pull uniformly, so as to draw the machine or implement over the ground in a straight line.

Other objects and advantages are contemplated and will become apparent as the nature of the invention is understood; and to this end the improvement consists in certain details of construction, novel features, and the peculiar combinations of the parts, which hereinafter will be more fully described, illustrated, and finally claimed.

In the accompanying drawings is illustrated an embodiment of the invention, although slight changes in the details, proportions, and arrangement of the parts may be resorted to without departing from the spirit and essence of this invention, and in said drawings—

Figure 1:
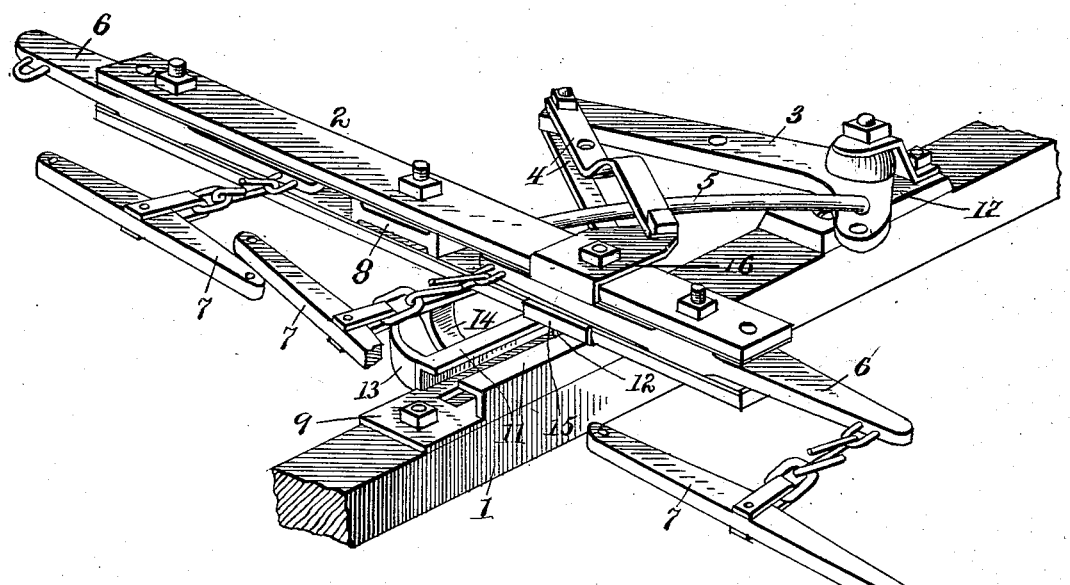
Figure 2:
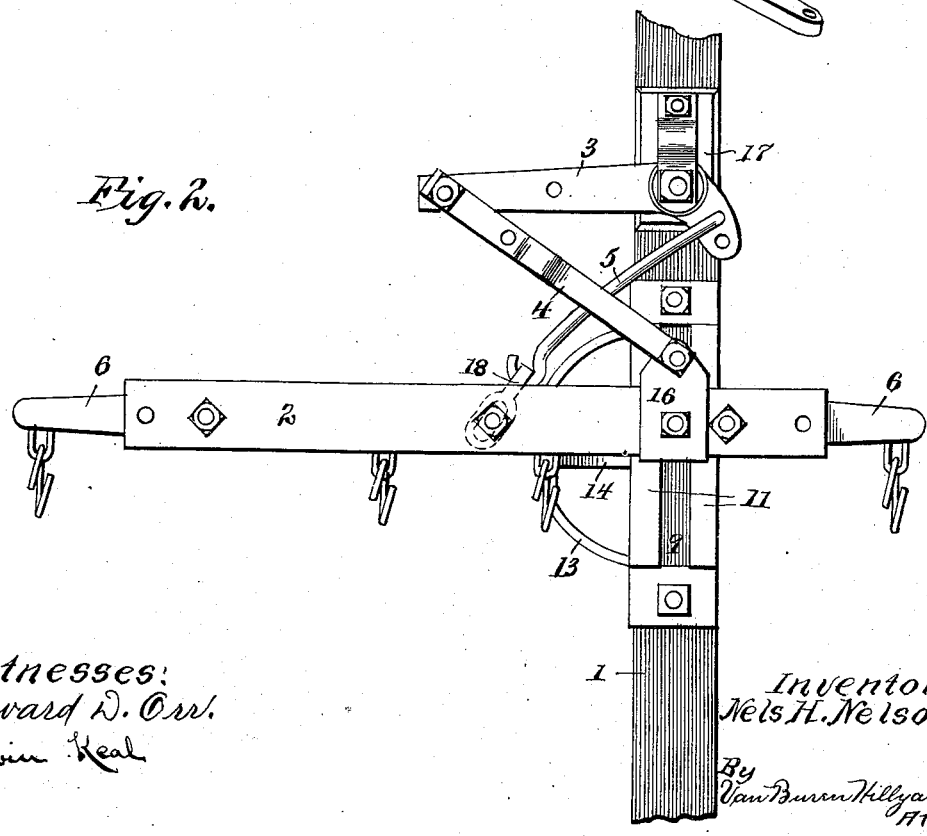

Figure 1 is a perspective view of the equalizer, showing it adapted for four horses. Fig. 2 is a top plan view thereof. Fig. 3 is a transverse section of Fig. 2, looking to the rear. Fig. 4 is a detail perspective view of the guide-casting attached to the pole or tongue and directing the draft-beam in its movements. Fig. 5 is a detail view of the wheel to which the draft-beam is fulcrumed. Fig. 6 is a detail view showing the manner of pivotally connecting the front ends of the brace members with the draft-beam. Fig. 7 is a detail view showing the equalizer arranged for three horses.

The same reference-numerals denote corresponding and like parts in all the figures and drawings, in which—

1 indicates the pole or tongue of an agricultural implement; 2, the draft-beam; 3, the equalizing-lever; 4 and 5, braces connecting the opposite ends of the equalizing members with the draft-beam; 6, the whiffletrees, and 7 the singletrees, which have connection with the whiffletrees in any desired and approved manner and to which the horses are hitched in the usual way.

The draft-beam is composed of upper and lower members extending in parallelism and spaced apart a sufficient distance to admit of the whiffletrees operating easily between them, a spacing-block 8 being centrally disposed between the said members to hold them the required distance apart. The members of the draft-beam are preferably wooden bars, which are faced on their inner sides with metal plates to receive the wear occasioned by the movements of the whiffletree and to strengthen the said bars.

A casting 9 is secured to the pole or tongue 1 and has a pendent portion 10, which extends along one side of the pole so as to sustain lateral stress, and vertical portions 11, extending in parallelism, are grooved on their inner or opposing side to form ways in which travels a wheel 12, to which the draft-beam is fulcrumed. An approximately semicircular support 13 projects horizontally from the upper end of the casting 9, and its top side is in the plane of the top side of the parts 11 and is intended to sustain the draft-beam and relieve the pivotal connection between the draft-beam and the wheel 12 of abnormal strain. This support 13 is braced by a stay 14, extending from a middle point thereof to and having connection with the lower end of the pendent portion 10. The casting 9 and the parts intimately associated therewith may be integrally formed or be separate and connected together in any convenient and substantial way.

A plate 15 is secured to the lower side of the draft-beam and carries the wheel 12, which latter is of a size to fit snugly and operate in the grooves of the vertical portions 11, the parts being substantially formed so as to withstand the strain to which they will be subjected in the efficient working of the equalizer. A companion plate 16 is secured to the top side of the draft-beam in vertical alinement with the plate 15, and the rear ends of the plates 15 and 16 project a short distance in the rear of the draft-beam to provide for the pivotal connections therewith of the front ends of the members comprising the brace 4.

The equalizing-lever 3 is of the elbow type and is fulcrumed at the elbow to a casting 17, secured to the pole or tongue in the rear of the casting 9, and its long arm has connection with the draft-beam by means of the brace 4 and its short arm with the draft-beam at a middle point by means of the brace 5. A clevis 18 has pivotal connection with the draft-beam, and the front end of the brace 5 is attached thereto, thereby admitting of the various movements of the parts without interference or binding. To equalize the strain, the brace 5 is disposed and operates between the members of the brace 4. The braces 4 and 5 have adjustable connection with the respective arms of the equalizing-lever, thereby adapting the device to be successfully used as a four or three horse equalizer.

In the operation of the invention the wheel 12 travels in the guideways of the casting 9 and the draft-beam receives a combined oscillatory and reciprocating movement, thereby obviating any slack and causing the horses to pull evenly, and by reason of the disposition of the parts herein specified all side draft is obviated and the implement is drawn or caused to move in a straight line over the ground. It is obvious that the parts may be disposed so that three of the four horses may travel upon either side of the pole or tongue, as required.

When adapting the equalizer for three horses, the whiffletree at the outer end of the long arm of the draft-beam is replaced by a singletree, the rear end of the brace 4 is connected with the equalizing-lever nearer its fulcrum, and the brace 5 is attached to the short arm of the equalizing-lever at a greater distance from the fulcrum thereof. By this disposition of the braces 4 and 5 the leverage of the long arm is decreased and the leverage of the short arm proportionately increased, thereby making provision for the dispensing with the fourth horse. The manner of connecting the singletree with the doubletree is not essential to the essence of the invention, and any of the well-known means may be provided. For some purposes and under certain conditions the members of the draft-beam may be brought together, but the arrangement of the parts herein specified is preferred, as the best results are attained.

Having thus described my invention, what I claim, and desire to secure by Letters Patent, is—

1. In a draft-equalizer, the combination of a pole or tongue, a casting secured thereto, and having vertical portions extending in parallelism and grooved on their inner sides to form guideways, and having a horizontally-extending semicircular support, whose top surface is in the same plane with the top of the casting, a wheel mounted and operating in the guideways of the casting, a draft-beam resting upon the said semicircular support and casting and fulcrumed to the said wheel, and adapted to have the team hitched thereto, and an equalizing-lever operatively connected with the draft-beam substantially in the manner shown for the purpose described.

2. A draft-equalizer constructed substantially as herein set forth, the same comprising a pole, a casting secured to the pole and having a pendent portion, extending down along the side thereof, a horizontally-extending semicircular support, with its top side in the same plane with the top of the casting, a stay between the pendent portion and the semicircular support and having vertical portions extending in parallel relations and grooved on their inner or opposing sides to form guideways, a wheel operating and mounted in the guideways of the casting, a draft-beam comprising parallel members which are spaced apart and fulcrumed to the said wheel and adapted to have the team hitched thereto, an equalizing-lever disposed in the rear of the draft-beam, a brace comprising two members which have pivotal connections at their front ends with the members of the draft-beam immediately in the rear of its fulcrum and which have adjustable connection with the long arm of the equalizing-lever, and a second brace having connection with the draft-beam at a middle point and adapted to make adjustable connection with the short arm of the equalizing-lever, substantially as set forth for the purpose described.

In witness whereof I have hereunto signed my name in the presence of two subscribing witnesses.

NELS H. NELSON.

Witnesses:
A. J. NELSON,
R. E. BAKKE.